No. 685,828. Patented Nov. 5, 1901.
C. B. ELLIOTT.
AXIS FINDER FOR LENSES.
(Application filed Nov. 12, 1900.)
(No Model.)
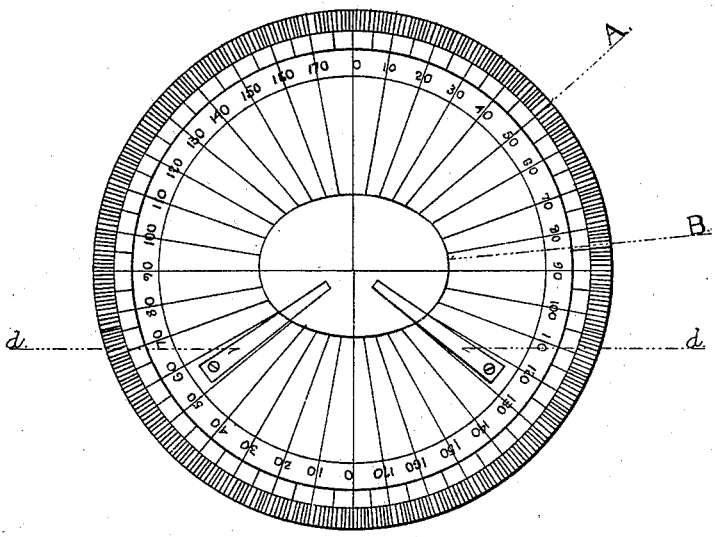
WITNESSES:
Victor E. Keppel
Fred C. St. John
Charles Burntrager Elliott
INVENTOR
THE NORRIS PETERS CO., PHOTO-LITHO, WASHINGTON, D. C.

UNITED STATES PATENT OFFICE.

CHARLES BURNTRAGER ELLIOTT, OF LOS ANGELES, CALIFORNIA.

AXIS-FINDER FOR LENSES.

SPECIFICATION forming part of Letters Patent No. 685,828, dated November 5, 1901.

Application filed November 12, 1900. Serial No. 36,319. (No model.)

*To all whom it may concern:*

Be it known that I, CHARLES BURNTRAGER ELLIOTT, a citizen of the United States, residing at No. 319 South Spring street, in the city and county of Los Angeles and State of California, have invented certain new and useful Improvements in Axis-Finders for Lenses; and I do hereby declare the following to be a full, clear, and exact description of the invention, such as will enable others skilled in the art to which it appertains to make and use the same.

My invention relates to an improvement in instruments used in measuring, locating, or finding the degree of axis of cylinder optical lenses in which by using a transparent plate or disk the locating of such axis is facilitated.

The mechanism of my machine is illustrated in the accompanying drawing, in which the figure represents a face view of the entire machine.

The plate or disk A is glass or any transparent material of the diameter from three to eight inches or larger and having a thickness of about one-eighth to one-fourth inch. On this plate or disk are marked, etched, or printed the degrees of a circle, as shown in the drawing.

B is a guide-line etched, marked, or printed on the glass disk or plate, inclosing an area the size of an O-sized optical lens.

*d* and *d* are spring clasps or clamps so placed for the purpose of holding the lens to be tested in the position marked by the guide-line B. Having so placed the lens to be tested in a position marked by the guide-line B, I take up the instrument with lens attached, and holding it in a vertical position, about twelve inches from the eye, I then glance through said lens with one eye closed at any given vertical line—as, for instance, the edge of a door-jamb—and notice that the refracted image of said given line is not on line with or continuous with the given line which I see beyond the edges of the lens being tested. I now rotate said instrument until the refracted image of said line passing through the center of the lens being tested is absolutely on a line and continuous with the given line which I see beyond the edges of the lens. Then glancing at the point where said given line crosses the scale I note the degree of axis of the lens being tested.

What I claim, and desire to secure by Letters Patent, is—

A transparent plate having marked thereon a guide-line to indicate the position of the lens to be tested, and a transparent portion around said guide-line having radial lines extending from said guide-line to the periphery of the plate, and having marked on said periphery the degrees of a circle, said plate being provided with arms secured directly to the edge of said plate and extending inwardly to the central portion of the plate within the said guide-line, said arms being adapted to press said lens against said plate and in the position indicated by the guide-line.

In testimony whereof I affix my signature in presence of two witnesses.

CHARLES BURNTRAGER ELLIOTT.

Witnesses:
VICTOR E. KEPPEL,
FRED. C. ST. JOHN.